United States Patent [19]
Rau

[11] 3,869,948
[45] Mar. 11, 1975

[54] SHEAR APPARATUS
[75] Inventor: Robert J. Rau, Pittsburgh, Pa.
[73] Assignee: Aetna-Standard Engineering Company, Ellwood City, Pa.
[22] Filed: Mar. 7, 1974
[21] Appl. No.: 448,888

[52] U.S. Cl. ................. 83/286, 83/310, 83/328, 83/345, 83/369, 83/699
[51] Int. Cl. ........ B26d 1/40, B26d 1/56, B26d 5/40
[58] Field of Search ............ 83/328, 345, 286, 287, 83/310, 369

[56] References Cited
UNITED STATES PATENTS

| | | | |
|---|---|---|---|
| 1,333,704 | 3/1920 | Buschmeyer | 83/328 |
| 2,157,000 | 5/1939 | Morgan et al. | 83/328 |
| 3,686,987 | 8/1972 | Colinet et al. | 83/328 X |
| 3,786,707 | 1/1974 | Becker et al. | 83/328 X |

*Primary Examiner*—Frank T. Yost
*Attorney, Agent, or Firm*—Bosworth, Sessions & McCoy

[57] ABSTRACT

Flying shear apparatus is disclosed suitable for cutting elongated strand material as it moves in a predetermined path. The apparatus includes two crankshafts having eccentric crank pins on which knife holding portions are rotatably mounted, each knife holding portion being rigidly connected to one end of a link member the other end of which is pivotally connected to a movable member that reciprocates in a fixed path, both link members being pivotally connected to the movable member about a common axis. Furthermore, the apparatus includes means to permit individual adjustment of the angular position of a crankshaft relative to the other, to permit adjustment of the cutting blade clearance. The slidable member also acts as a guide for the strand material being cut. The arrangement provides positive control and synchronization of the relationships of the cutting blades relative to each other at all times.

20 Claims, 6 Drawing Figures

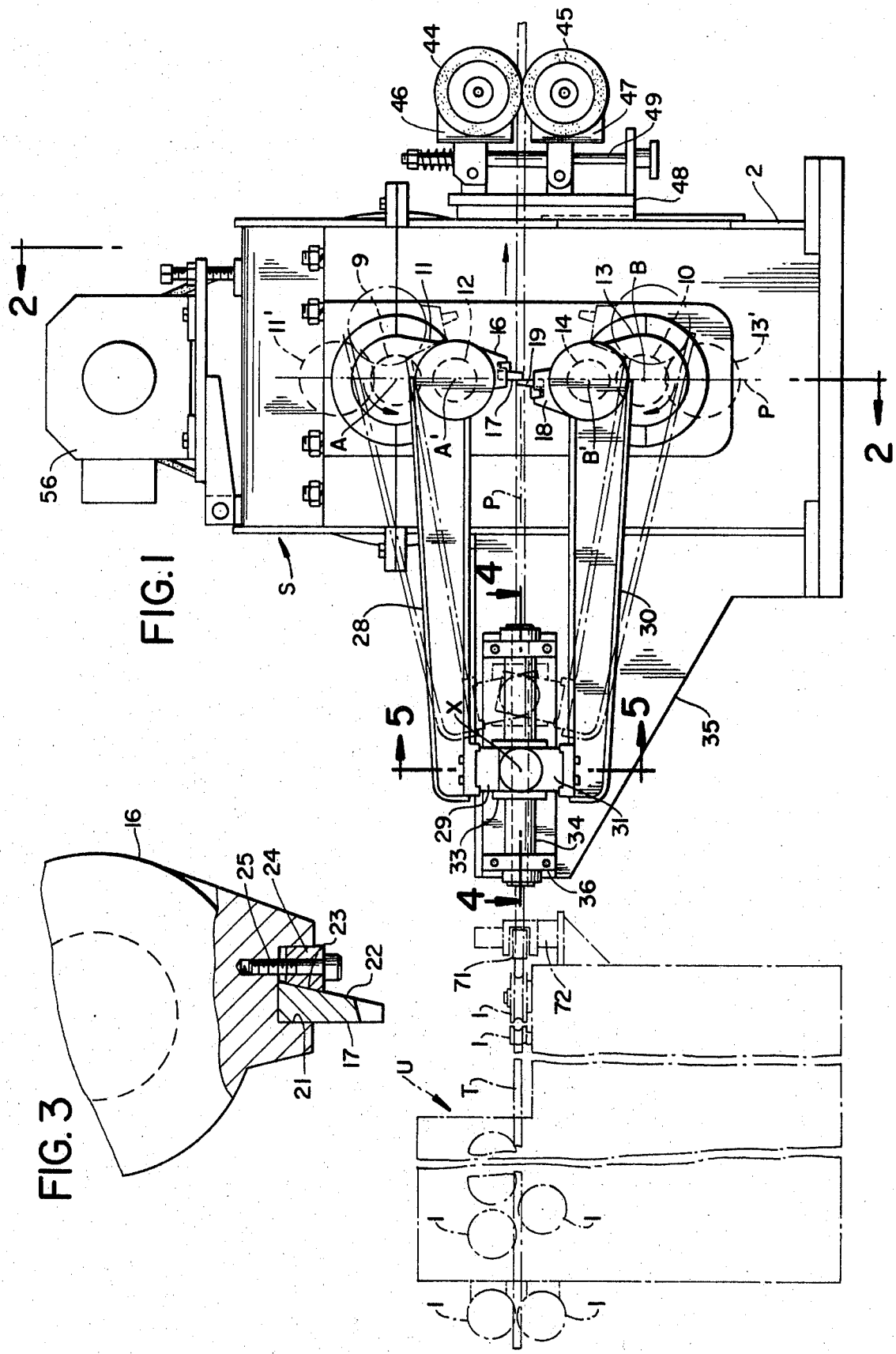

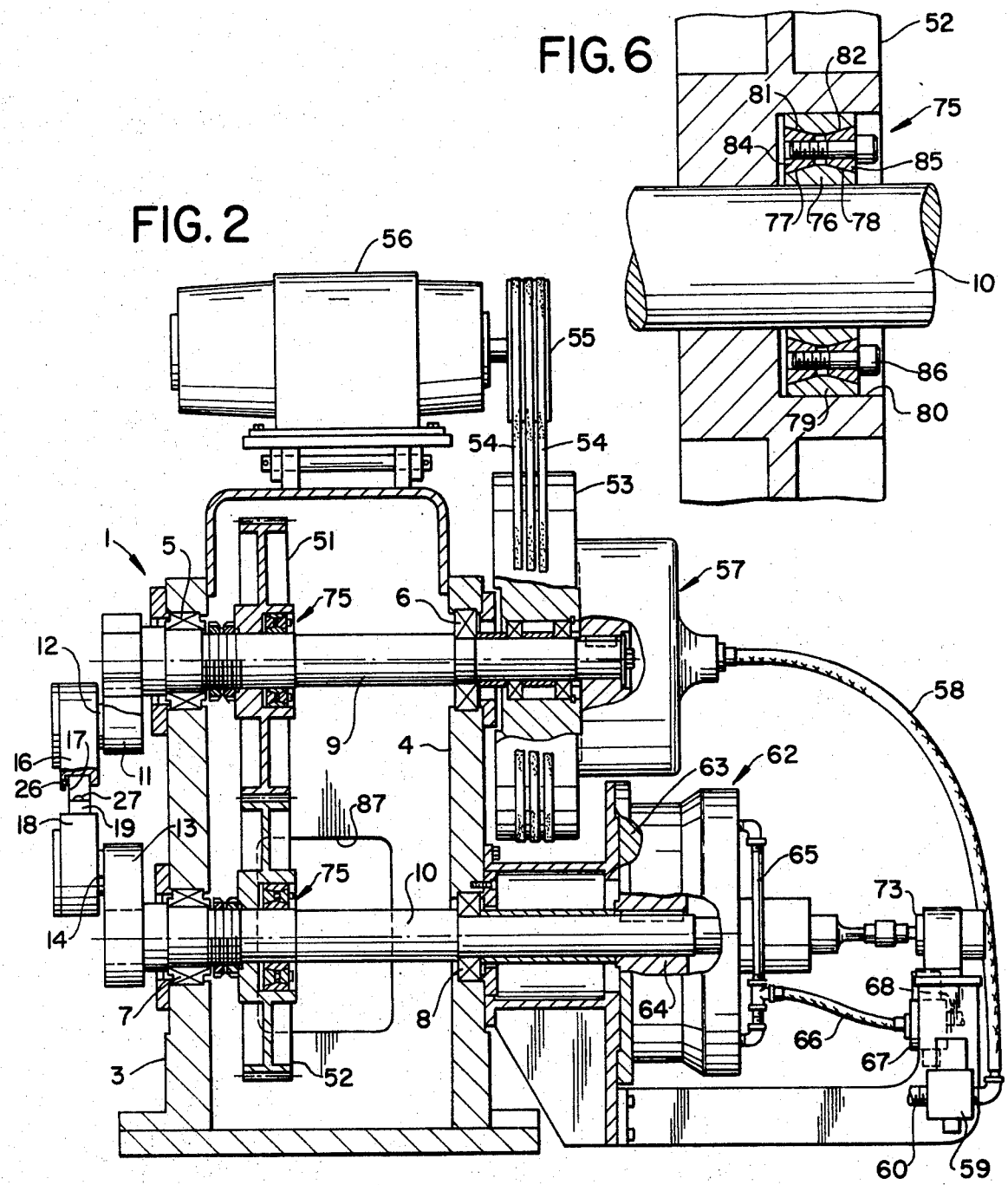

SHEAR APPARATUS

FIELD OF THE INVENTION

This invention relates to shear apparatus embodying two relatively movable cutting blades that cut a workpiece.

While the invention may be used with various types of shear apparatus, it provides particular advantages when used in a rotary flying shear for cutting a moving elongated workpiece, and therefore will be discussed hereafter as so used.

In a flying shear of the type in which the blades are moved relatively to each other to cut strand material as it is moving, it is important that the blades not only move in the direction of movement of the material being cut at a speed commensurate with the speed of the material being cut, but also that the blades be accurately located with respect to each other and that their movements be accurately synchronized relative to each other to cause proper, accurate and effective cutting action.

The solution to this problem is more difficult when the flying shear is used to cut a workpiece traveling at a high speed.

Various proposals have been made to solve the problem, but in general they have not been as satisfactory as desired.

SUMMARY OF THE INVENTION

The present invention provides shear apparatus, preferably flying shear apparatus, which overcomes the disadvantages of prior apparatus and provides accurate relative positioning of the blades during the cutting strokes and accurate synchronization of blade movements at all times.

The invention provides such shear apparatus comprising two crankshafts mounted about axes on opposite sides of a predetermined path of movement of the workpiece being cut, each of the crankshafts having a crank pin offset from the axis of rotation of the crankshaft, there being a blade holding portion carrying a cutting blade that is rotatably mounted on the crank pin of each of the crankshafts, the apparatus including means for rotating the crankshafts simultaneously in opposite angular directions so that the cutting blades repeatedly approach in cutting relation and separate. The apparatus also includes a member reciprocatorily movable in a path substantially parallel to the path of travel of the workpiece being cut, and a pair of link members each of which is rigidly connected at one end to one of the blade holding portions and at the other end is pivotally connected to the movable member. Preferably the supporting member acts as a guide through which the piece passes.

The apparatus of the invention may also provide for accurate adjustment of the positions of the cutting blades relative to each other. The arrangement embodying the link members provides for accurate synchronization of movement of the cutting blades and accurate location of the blades relatively to each other at all times. The apparatus may be made strong and rugged so as to operate satisfactorily at high speeds for long periods with little if any maintenance problems.

BRIEF DESCRIPTION OF DRAWINGS

The above and other objects, advantages and features of the invention are disclosed below in connection with the below described drawings of a preferred embodiment of the invention, in which:

FIG. 1 is a side view of apparatus embodying the invention, as used for shearing tubes the apparatus embodying the invention being shown in full lines, and a known straightener apparatus from which the tube passes to the apparatus of the invention being shown in broken lines;

FIG. 2 is a section substantially along line 2—2 of the apparatus of FIG. 1 and to a larger scale;

FIG. 3 is a detail fragmentary view to a larger scale showing the knife holding portion on one of the crank arms of the apparatus;

FIG. 6 is a view to a larger scale showing the adjustable mounting on its crankshaft of one of the driving gears of the apparatus of the invention.

DESCRIPTION OF THE PREFERRED EMBODIMENT

Figure 4:
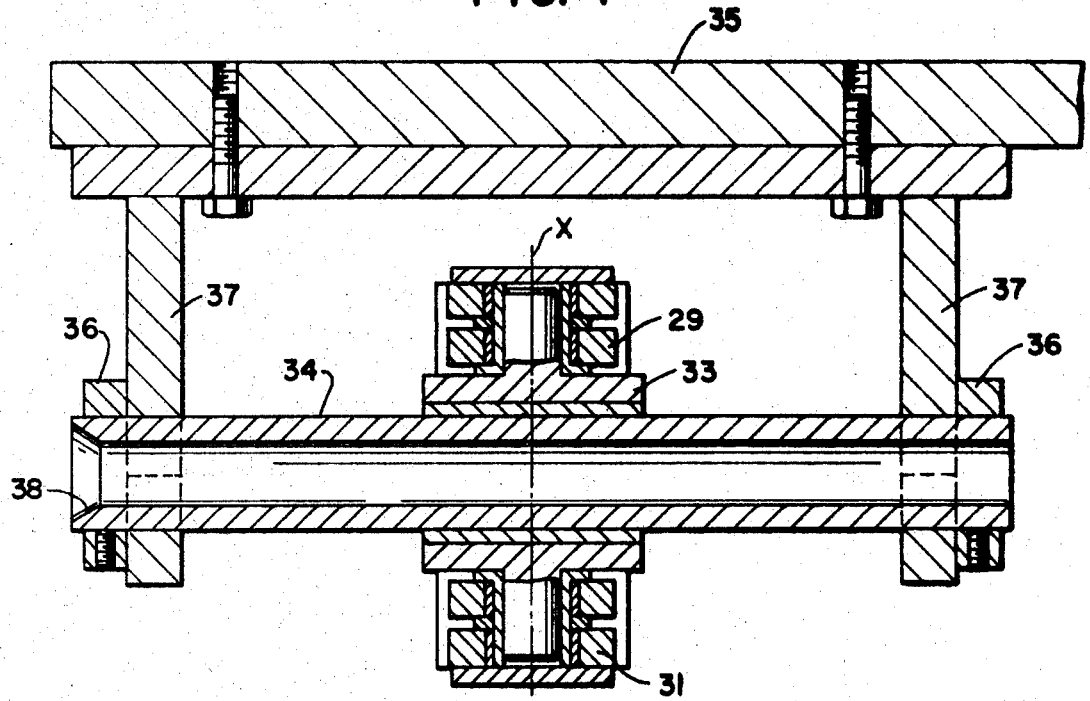
FIG. 4 is a section along line 4—4 of FIG. 1 but to a larger scale.

In FIG. 1, the workpiece being cut, taking the form of long length tubing T, passes in the direction indicated by the arrows, from a processing unit U, illustrated as a known two-plane straightener, to apparatus S embodying the invention and shown as a flying shear.

The straightener embodies known power-driven straightening rolls 1 disposed with their axes of rotation at right angles, to straighten the tubing T and pass it to the flying shear S in a predetermined path P along which the tubing travels in the indicated direction. Shear S is adapted to cut the tubing T to predetermined lengths as it moves in its path.

Shear S comprises a base 2 taking the form of a housing having spaced walls 3, 4 carrying antifriction bearings 5, 6, 7 and 8 that respectively rotatably support two crankshafts 9 and 10 for rotation about axes A and B (FIGS. 1, 2) that are equidistantly disposed in parallel relation on opposite sides of the path of travel of the tubing T, preferably in a plane P normal to such path (FIG. 1).

Crankshaft 9 rigidly carries a crank 11 and a crank pin 12 having an axis A' offset from and parallel to axis A; and crankshaft 10 rigidly carries a crank 13 having a crank pin 14 having an axis B' offset from and parallel to axis B by a distance preferably identical with the offset distance of axis A' of the other crank pin.

Crank pin 12 rotatably carries a blade holding portion 16 that rigidly carries a cutting blade 17. Similarly, crank pin 14 rotatably carries a blade holding portion 18 carrying a cutting blade 19.

As shown in FIGS. 1, 2, 3, blade holding portion 16 demountably carries the cutting blade 17 in a recess 21, blade 17 having an inclined surface 22 against which bears a mating inclined surface 23 of a wedge member 24 that is forced against the blade by one or more bolts 25. The blade is held against axial movement by set screw 26. The blade 19 of the other crank member is similarly demountably secured in blade holding portion 18. As shown in FIG. 2, the cutting edges of the blades are semicircularly curved as at 27 to match the tube cross section to effectively cut it. The blades thus may be readily changed to cut different sizes of tubes, or removed for sharpening.

Figure 5:
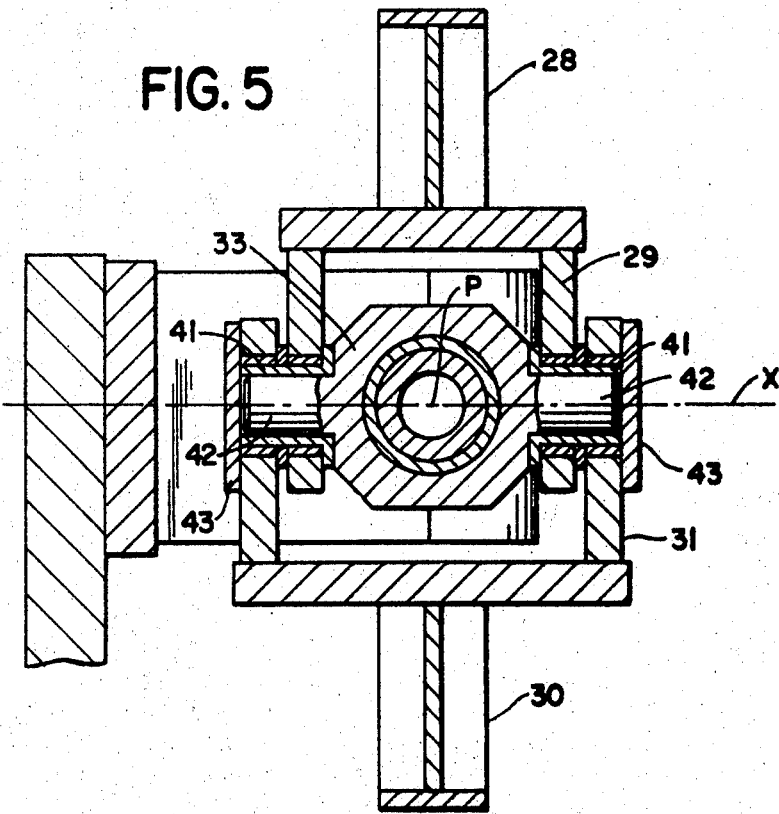
FIG. 5 is a section along line 5—5 of FIG. 1 but to a larger scale.

A link member 28 is rigidly secured at one end to blade holding portion 16; the other end of member 28 is rigidly fixed to a bracket 29. The other blade holding portion 18 has also rigidly fixed to it one end of a link member 30 the other end of which is fixed to another bracket 31. Brackets 29 and 31 are pivotally connected about a common axis X to a member 33 that is movable and reciprocates in a fixed path substantially coincident with, and hence substantially parallel to, the path of travel of tubing T as the crankshafts rotate. More specifically, as shown in FIGS. 1, 4 and 5, movable member 33 is slidably mounted to reciprocate on a tubular guide member 34 that is rigidly secured on an extending portion 35 of base 2 by clamps 36 secured to member 34 and bearing against arms 37 fixed on extending portion 35. The illustrated guide member 34 has a generally tapered surface 38 at its entrance end to facilitate initial entry of the leading end of the tubing. The tubing being cut passes through such bore and along its path of travel to the cutting blades 17 and 19 in operation of the illustrative apparatus.

As shown in FIGS. 1, 4 and 5, brackets 29 and 31 are pivotally mounted on bearing bushings 41 that are mounted on transversely horizontally oppositely extending pins 42 on the sides of movable member 33. End plates 43 are demountably mounted on the sides of bracket 31 to hold the bushings 41 and the brackets in place on the pins 42, and to protect them from dirt.

The arrangement illustrated is such that the tubing being cut passes through the guide member 34, and therefore also through the slidable member 33 to which the link members 28 and 30 are pivotally connected; and these link members are disposed above and below and hence on opposite sides of the path along which tubing T passes and of the slidable member 33 and guide member 34.

Known resiliently surfaced power driven pinch rolls 44 and 45 are disposed at the end of the base 2 opposite the end to which link members 28 and 30 extend and beyond the location at which the tubing T is cut, to support the tubing before it is cut and to support and transport the cut pieces of tubing away from the machine. These rolls are supported on known types of power driven mounting units 46 and 47 that by known means, not shown, urge the pinch rolls together to grip the tubing and rotate the rolls. These units are pivotally mounted on a supporting member 48 fixed to base 2. Adjusting means including rod 49 extending through brackets 46, 47 are provided to adjust the roll pressure on the tubing.

The crankshafts 9 and 10 are rotated in unison but in opposite directions as required to effect cutting of the tube T as it moves, by intermeshing gears 51 and 52 that are rigidly secured to the crankshafts. The gears are of equal size, have the same number of teeth, and directly mesh so that the shafts 9 and 10 rotate in unison in opposite directions.

A flywheel type pulley 53 is mounted on the end of shaft 9 that is opposite the crank 11. The pulley 53 is driven by belts 54 from a pulley 55 mounted on the drive shaft of electric motor unit 56 on the base 2. Pulley 53 is adapted to be connected in driving engagement with, and disconnected from, the shaft 9 as required by a known clutch 57 that is hydraulically operated by energizing fluid supplied through conduit 58 and solenoid valve 59 from conduit 60 connected to a source, not shown, of hydraulic fluid under pressure.

The other shaft 10 has a known fluid operated brake unit 62 mounted at its end opposite its crank 13, to halt and release the shaft as required. Brake unit 62 comprises a fixed brake plate 63 and a rotatable brake plate 64 mounted on and rigid to shaft 10 for axial but no rotatable movement relative to the shaft. This brake unit is to engage movable brake plate 64, as required, by hydraulic fluid supplied through pipes 65, conduit 66 through another solenoid valve 67, from conduit 68 connected to fluid under a suitable source of hydraulic pressure, not shown.

Measuring wheel 71 on the straightener unit U is rotated by the tube T as it passes to and through the shear S. The measuring wheel is part of a known measuring unit 72 that is electrically connected by known means to control the solenoids of valves 59 and 67 so that after a predetermined number of revolutions, which determines a predetermined length of tube, the measuring wheel unit sends a signal to actuate the solenoid valves to actuate the clutch 57 and deactivate the brake 62. This permits the crankshafts 9 and 10 which are normally in inactive positions shown by the locations in broken lines 11' and 13' of their cranks in FIG. 1, to revolve and move the cutting blades 17 and 19 to the cutting positions shown in full lines. The cranks on the crankshafts are so arranged that the cutting blades are in full cutting position when they are at the midpoint, that is, when the overlapping surfaces of the cutting blades, the axes A and B of the crankshafts, and axes A' and B' of the cranks, all lie in the same plane as shown in full lines in FIG. 1.

A known switch 73 (FIG. 2) connected to the rear of the end of the lower shaft 10 is adapted to provide an electrical signal that through known means not shown, actuates solenoid valves 59 and 67 to cause the clutch 57 to disengage and the brake 62 to engage at the proper time to cause the crankshafts to halt with their cranks at the upper and lower dead centers as shown in broken lines 11' and 13' in FIG. 1, and therefore with their blades in their widest apart positions.

In operation, the flywheel-pulley 53 is rotated continuously by the motor unit 56. However, except when the blades are moving for cutting, the clutch 57 is disengaged and the brake 62 is engaged, and the crankshafts 9 and 10 are stationary and angularly positioned with their cranks in their upper and lower dead center positions and with their blades 17 and 19 in their widest apart positions.

After a predetermined length of tube passes in contact with the measuring wheel 71, the proper signal is sent by unit 72 to actuate the solenoid valves 59 and 67 to engage the clutch 53 and disengage the brake 62; this permits the pulley 53 to rotate the crankshaft 9, and crankshaft 10 geared to it, in opposite directions as indicated by the arrows in FIG. 1, until blades 17 and 19 are in full cutting engagement as shown in full lines in FIG. 1. Rotation is continued until the cranks approach their upper and lower dead center positions, at which time the switch 73 sends a signal to disengage the clutch 57 and engage the brake 62; this halts rotation of crankshaft 10 and also its geared crankshaft 9 in such positions, with their blades apart. The cut length of tubing is meanwhile moved out of the apparatus by the pinch rolls 44 and 45.

This process is repeated so long as motor unit 56 is operating and tubing is fed past the measuring wheel 71.

Since the blade-supporting portions 16 and 18 are rigidly connected to link members 28 and 30 and these link members are pivoted about a common axis on the slidable member 33, positive alignment and synchronization of movement and position of the blades relative to each other is provided at all times, including during the cutting stroke which occurs as the blades move substantially in the direction of travel of the tubing at substantially the same speed as the tubing. Accurate cutting is obtained even though the tubing is traveling at a high speed and the crankshafts are rotating at a high speed. Further accuracy is provided because the tubing being cut passes through the guide member 34 which accurately locates it for cutting, and because the link members are mounted in alignment with the path of travel of the tube, so that a balanced operation results.

Further cutting accuracy and effectiveness are provided by means for adjusting the positions of the cutting blades relative to each other. This is accomplished in the illustrated embodiment by adjustment of the angular positions of the crankshafts 9 and 10 relative to each other. In the illustrated embodiment neither of gears 51 or 52 is keyed to its crankshaft, although it is rigidly secured to its crankshaft by means permitting angular adjustment of the gear relative to its crankshaft. FIG. 6 illustrates a means for so securing gear 52 to crankshaft 10; gear 51 is shown secured to crankshaft 9 by identical means.

Gear 52 is secured to shaft 10 by a known wedge unit 75 (FIG. 6) comprising an annular wedge member 76 adapted to be clamped to the shaft, and having two outwardly facing oppositely inclined surfaces 77 and 78. Another annular wedge member 79 is adapted to be clamped to the inner surface of a recess 80 in the hub of gear 52; it has two inwardly facing oppositely inclined surfaces 81 and 82. Wedging rings 84 and 85 respectively bear against the inclined surfaces 77 and 81, and 78 and 82 and are drawn together by bolts 86 to cause the gear 51 to be firmly secured to the shaft 9. However, by loosening the bolts 86, the gear 52 can be turned relative to the shaft.

Since both gears are shown as secured to their crankshafts by wedge units 75, either of the wedge units 75 can be loosened and its gear rotated relative to its crankshaft. However, in the illustrated embodiment the adjustment is preferably made between gear 52 and its shaft 10 through an access opening 87 in base 2. Gear 52 can thus be loosened and rotated relative to its crankshaft 10, which causes the other gear 51 and its crankshaft 9 to rotate. This permits adjustment of the positions of the crank arms relative to each other until their cutting blades are brought to the proper cutting position with minimum clearance. The bolts 86 are then tightened.

The length of tubing being cut can also be altered by changing the number of rotations which the measuring wheel 71 makes before it sends the appropriate signal to actuate the clutch 57 and brake 62 so that a wide range of lengths of material can be cut, even down to as short a length as the distance between the axes of a crankshaft and its crank pin.

Tests have shown that the illustrated apparatus will work satisfactorily to shear lengths of tubing as long as 100 feet at speeds of 1000 feet per minute.

Various modifications may be made in the apparatus and processes illustrated above. Thus, although the apparatus has been illustrated as for cutting tubing, to which it is well adapted, other elongated material may be cut.

While the member 34 has been shown of circular exterior cross section, it is apparent that other cross sections may be used.

While the means illustrated for measuring the length of material being cut has been proven satisfactory, other means than that illustrated may be used to actuate the cutting blades.

Various modifications apparent to those skilled in the art in addition to those indicated above, may be made in the apparatus and methods disclosed above, and changes may be made with respect to the features disclosed, provided that the elements set forth in any of the following claims or the equivalents of such be employed.

I claim:

1. Shear apparatus for cutting an elongated workpiece that is movable in a predetermined path of travel comprising two crankshafts rotatably mounted about axes on opposite sides of said path of travel each of said crankshafts having a crank pin offset from the axis of rotation of said crankshaft, a blade holder carrying a cutting blade rotatably mounted on the crank pin of each of said crankshafts, means for rotating said crankshafts simultaneously in opposite angular directions so said cutting blades approach in cutting relation to cut said workpiece and separate, a movable supporting member movable in a fixed path substantially parallel to said predetermined path of travel of the workpiece, and a pair of link members each of which is connected at one of its ends to one of said blade holders and at its other end to said movable supporting member.

2. The apparatus of claim 1 in which the predetermined path of travel of said workpiece passes through said slidable supporting member.

3. The apparatus of claim 1 in which said link members are disposed on opposite sides of said predetermined path of travel of said workpiece.

4. The apparatus of claim 1 in which said cutting blades are adjustable relatively to each other.

5. The apparatus of claim 1 in which the angular position of at least one of said rotatable crankshafts is adjustable relative to the position of the other of said rotatable crankshafts.

6. The apparatus of claim 1 in which each of said link members is rigidly affixed to the blade holder to which it is connected.

7. The apparatus of claim 1 in which both of said link members are pivotally connected to said movable member.

8. The apparatus of claim 1 in which said movable supporting member is apertured in the direction of its path of travel and in which said workpiece passes through said movable member.

9. The apparatus of claim 1 in which said movable supporting member is apertured in the direction of its path of movement, and which comprises an elongated tubular member on which said movable supporting member is slidably mounted, and in which said workpiece passes through and is guided by said tubular member.

10. The apparatus of claim 1 comprising an elongated guide member for supporting and guiding the workpiece along its path of travel, and in which said movable supporting member is mounted for movement on said elongated guide member.

11. The apparatus of claim 1 in which said link members are pivotally connected to said movable member about the same axis.

12. Shear apparatus for cutting an elongated workpiece that is movable in a predetermined path of travel, comprising two crankshafts rotatably mounted about axes on opposite sides of said path of travel, each of said crankshafts having a crank pin offset from the axis of rotation of said crankshaft, a blade holder carrying a cutting blade rotatably mounted on the crank pin of each of said crankshafts, means for rotating said crankshafts simultaneously in opposite angular directions so said cutting blades approach in cutting relation to cut said workpiece and separate, a pair of link members each of which is connected at one of its ends to one of said blade holders, and means causing said other end of each link member to reciprocate in a path parallel to said path of travel of said workpiece while said crankshafts revolve and while said workpiece passes between said link members.

13. The apparatus of claim 12 in which said cutting blades are adjustable relatively to each other.

14. The apparatus of claim 12 in which the angular position of at least one of said rotatable crankshafts is adjustable relative to the position of the other of said rotatable crankshafts.

15. The apparatus of claim 12 in which each of said link members is rigidly affixed to the blade holder to which it is connected.

16. The apparatus of claim 12 comprising means for passing said workpiece between said other ends of said link members before it passes to said cutting blades.

17. The apparatus of claim 12 in which said link members are pivotally connected to said movable member about the same axis.

18. Flying shear apparatus for cutting an elongated workpiece as it moves in a predetermined path of travel, comprising two crankshafts rotatably mounted about axes on opposite sides of said path of travel, each of said crankshafts having a crank pin offset from the axis of rotation of said crankshaft, the off-set distances being substantially equal for both crankshafts, a blade holder carrying a cutting blade rotatably mounted on the crank pin of each of said crankshafts, means actuated by movement of a predetermined length of said workpiece for rotating said crankshafts in opposite angular directions as said cutting blades approach in cutting relation to cut said workpiece and separate, a tubular guide member rigidly mounted about the path of travel of said workpiece so said workpiece passes through said guide member and is guided by it, a movable supporting member slidably mounted on said tubular guide member to support it for movement in a path parallel to said workpiece, and a pair of link members each of which is rigidly connected at one of its ends to one of said blade holders and at its other end is pivotally connected to said movable supporting member.

19. The apparatus of claim 18 in which said link members are pivotally connected to said movable member about the same axis.

20. The apparatus of claim 18 comprising means for passing said workpiece through said tubular guide member and toward and between said cutting blades.

* * * * *